Sept. 24, 1957
J. Q. WOOD
2,807,523
PELLETING OF CARBON BLACK
Filed April 12, 1954
2 Sheets-Sheet 1
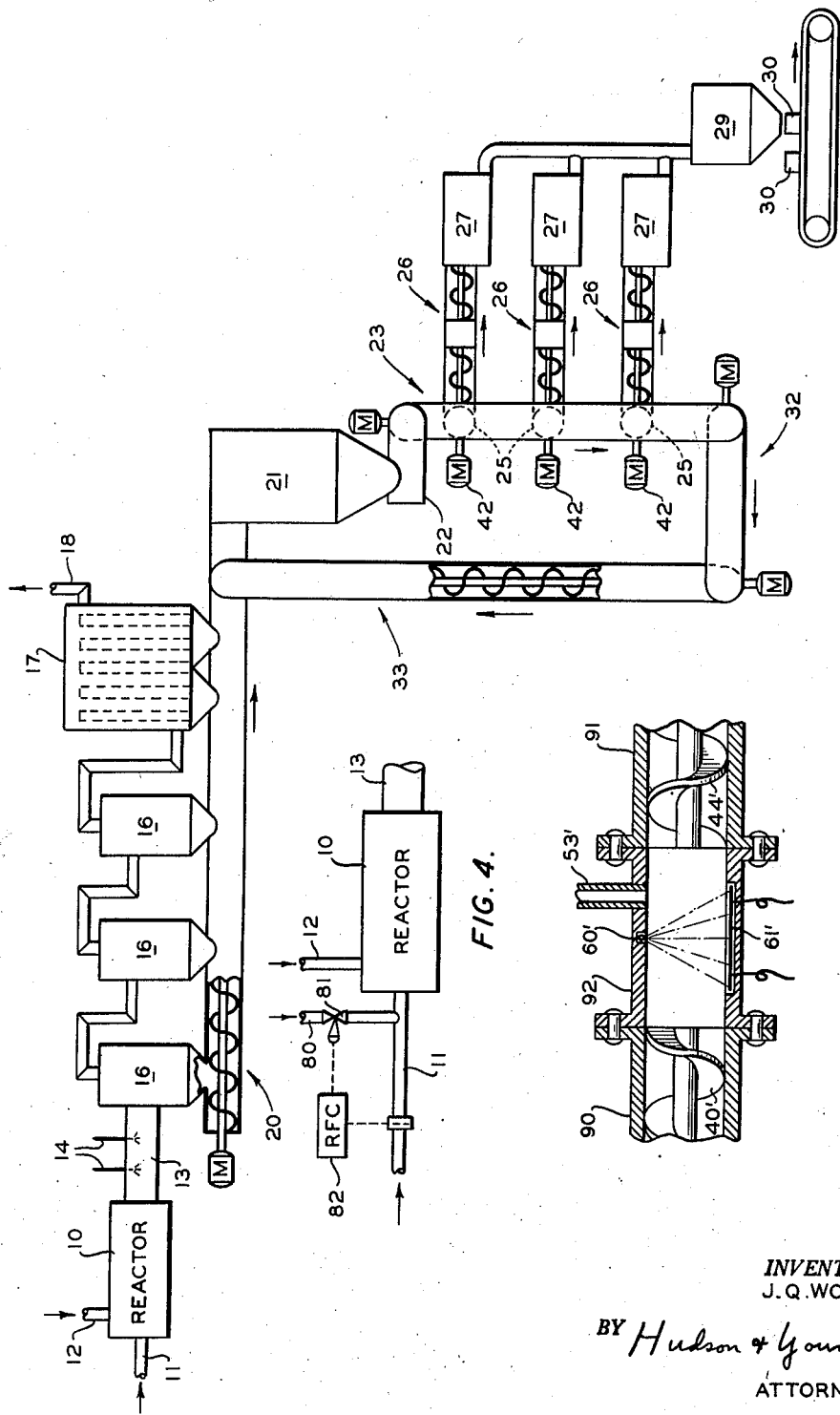
INVENTOR.
J. Q. WOOD
BY Hudson & Young
ATTORNEYS Sept. 24, 1957
J. Q. WOOD
2,807,523
PELLETING OF CARBON BLACK
Filed April 12, 1954
2 Sheets-Sheet 2
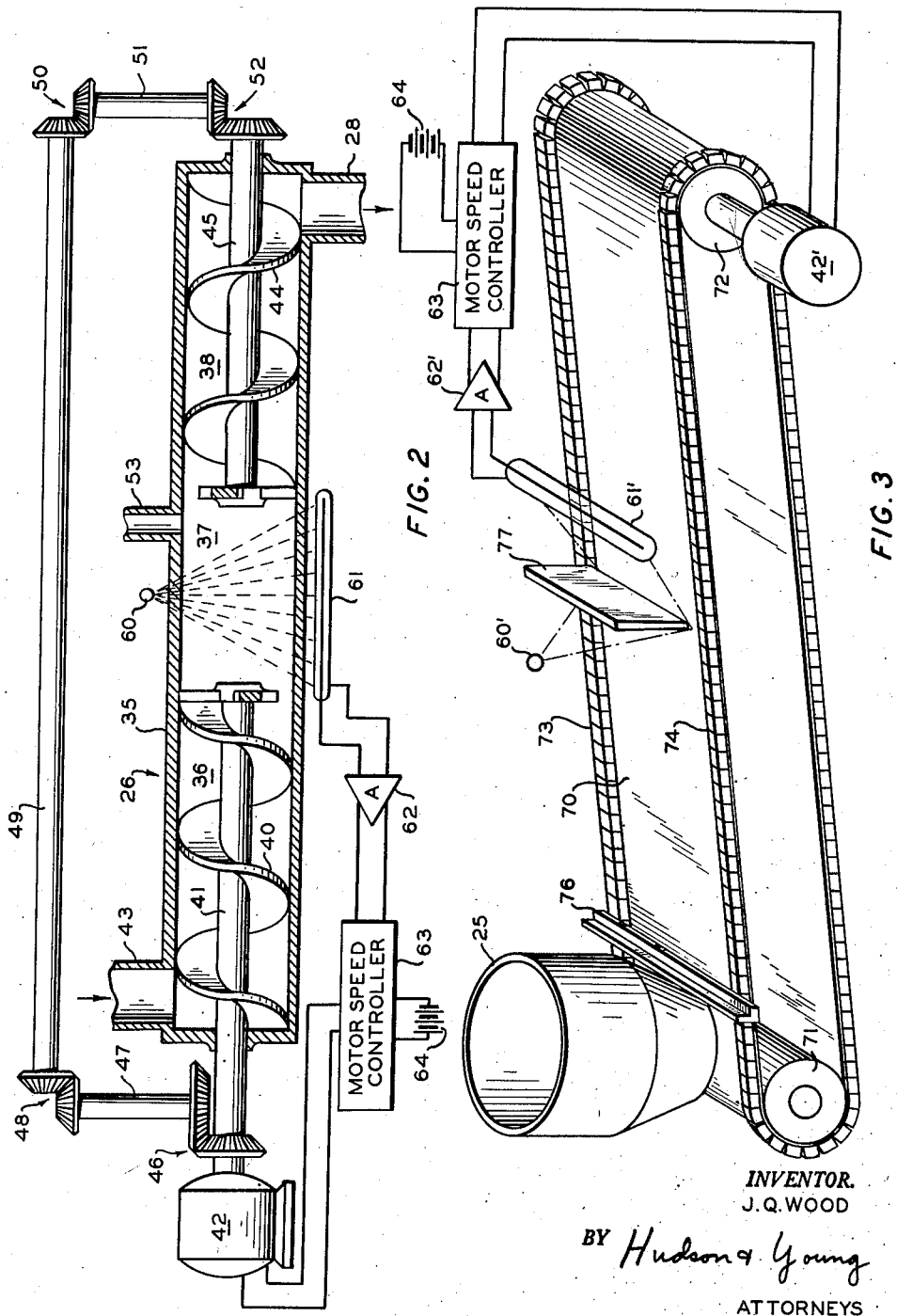
INVENTOR.
J. Q. WOOD
BY Hudson & Young
ATTORNEYS United States Patent Office 2,807,523
Patented Sept. 24, 1957

2,807,523
PELLETING OF CARBON BLACK

James Q. Wood, Bartlesville, Okla., assignor to Phillips Petroleum Company, a corporation of Delaware Application April 12, 1954, Serial No. 422,578

13 Claims. (Cl. 23—314)

This invention relates to the pelleting of carbon black. In one specific aspect it relates to means for regulating the flow of carbon black to a pellet mill.

For many years carbon black was produced primarily by the incomplete combustion of natural gas and other light hydrocarbon feed stocks by the well known channel process. Carbon black produced by this channel process and its numerous modifications can readily be formed into substantially dustless granules or pellets by procedures known in the art.

However, with the development of synthetic rubbers, it was found that for some purposes the fine particle channel black was unsatisfactory for compounding because of its hard processing characteristics. In order to produce satisfactory synthetic rubber for mechanical goods, extruded products and the like, it was found necessary to develop a new type of carbon black. This new carbon black has been referred to as high modulus furnace black, which is a structure carbon. Such furnace carbon black has the ability to maintain a chain-like grouping when dispersed in a rubber compound, as contrasted to the individual particle type channel blacks which disperse more completely as single discrete particles.

Chain structure carbon black can be produced by the incomplete combustion of various hydrocarbon fractions such as gas oil, or more viscous asphaltic crude oil fractions, or even lighter hydrocarbons. The structure carbon so produced, however, cannot be pelleted satisfactorily by the processes which previously were applied to the pelleting of channel black. To overcome this difficulty, pellet mills, such as described in U. S. Patent 2,642,343 have been designed. In order to make well finished or polished pellets which will withstand bulk handling and shipment it has been found necessary to maintain a certain critical bed depth which is characteristic of the pellet mill and a steady flow of loose black to the mill. The operator must, therefore, strive to maintain these conditions at all times in order that the pellets may be uniform in quality.

I have discovered that one of the main causes of non-uniformity in pellets made from carbon black by the dry pelleting process is the non-uniform flow of loose black to the mill. The principal cause of this erratic flow is a large variation in density of the loose black. It is common practice to collect the furnace black in a hopper and transport the same to the pellet mill by a screw conveyor. However, the density of the black in the conveyor often varies considerably, for example, as much as from approximately two to six pounds per cubic foot.

In accordance with this invention an improved carbon black pelleting process is provided which employs a novel system to control the passage of loose black so that a constant mass of black is fed to the pellet mill per unit time. In this respect, apparatus is provided to measure the density of the carbon black fed into the pellet mill. In response to this measurement, the rate at which the black is fed into the mill is adjusted so that the carbon black is fed at a constant rate with respect to its mass. This density measurement is made by transmitting penetrating radiation, such as gamma or beta rays, through a stream of the carbon black and measuring the resulting radiation. It has been found that the transmitted radiation is a function of the density of the carbon black. In another embodiment of this invention, a radioactive material is introduced into the system at a rate proportional to the rate at which the carbon black is produced. The radiation emitted from this material is then measured at a point closely spaced upstream from the pellet mill. The measured radiation is a function of the mass of black being passed to the mill, and the rate of flow of carbon black is regulated in response to this measurement. In a third embodiment of this invention, the radiation reflected from a uniform bed of carbon black is measured, this measurement also being a function of the density of the black.

Accordingly, it is an object of this invention to provide a control system for carbon black pelleting operations.

Another object is to provide an improved method of regulating the flow of carbon black fed to a pellet mill in response to a determination of the density of the carbon black.

Another object is to provide means for regulating the flow of a stream of solid particulate material in response to the quantity of radiation absorbed by such a stream.

A further object is to provide means for regulating the flow of a stream of solid particulate material in response to the radiation reflected from a bed thereof.

Other objects, advantages and features of this invention should become apparent from the following detailed description taken in conjunction with the accompanying drawing in which:

Figure 1 is a schematic representation of a carbon black producing unit;

Figure 2 is a detailed view of one embodiment of the control apparatus employed to regulate the flow of carbon black;

Figure 3 illustrates a second embodiment of the carbon black flow control mechanism;

Figure 4 represents a system of adding radioactive material to the produced carbon black; and Figure 5 illustrates a third embodiment of the flow control mechanism.

Referring now to the drawing in detail and to Figure 1 in particular, there is shown a carbon black producing reactor 10. An aromatic oil or hydrocarbon gas is fed axially into reactor 10 through a conduit 11. A fuel, comprising hydrocarbon gases or oils and sufficient oxygen in the form of air or oxygen-enriched air to support combustion, is introduced into reactor 10 through a conduit 12 in a direction generally tangential to the inner wall of reactor 10. The reaction products leave reactor 10 through a quench section 13 which is provided with one or more water lines 14. Reactor 10 can be of the type described in U. S. Patents 2,375,795 or 2,564,700, for example. The effluent from quench section 13, which comprises carbon black suspended in gases, is passed through one or more cyclone separators 16 and thence through a bag filter unit 17. The filtered gas is vented from unit 17 through a line 18. The carbon black removed from separators 16 and filter 17 drops into a screw conveyor 20 which transmit the black to a hopper 21. The loose carbon black passes from hopper 21 through a pulverizer 22 and thence to a second screw conveyor 23. The loose black in conveyor 23 falls into a plurality of drop-out boxes 25, from which it is fed by screw conveyors 26 into pellet mills 27. The pelleted black is removed from mills 27 and passed to a hopper 29 which fills suitable containers 30 for shipment. Screw conveyor 23 transmits the loose black at a rate greater than the capacity of drop-out boxes 25 in order to maintain a steady flow through the system. Return screw conveyors 32 and 33 are provided to return the unused loose black back to hopper 21. If desired, the returned black can by-pass hopper 21 and pulverizer 22 and be recirculated directly into conveyor 23 upstream from drop-out boxes 25.

A conveyor 26 is illustrated in detail in Figure 2. This conveyor comprises a conduit 35 which is divided into a compacting zone 36, a gauging zone 37 and an outlet zone 38. A screw 40, which is mounted on a rotatable shaft 41, is positioned in compacting zone 36. Shaft 41 is rotated by a suitable source of energy such as an electric motor 42. The loose carbon black passes into zone 36 from drop-out box 25 through a conduit 43. Rotation of screw 40 serves to pass this material downstream through conduit 35 into zone 37. A screw 44, which is mounted on a rotatable shaft 45, is positioned in outlet zone 38. Shaft 45 is suitably coupled to motor 42 as through gears 46, shaft 47, gears 48, shaft 49, gears 50, shaft 51 and gears 52. In this manner, screw 44 is rotated at a speed which is a function of the speed of rotation of screw 40. The speed of rotation of screw 44 preferably is somewhat slower than the speed of screw 40 so that the carbon black is compressed in zone 37. A conduit 53 communicate with the interior of zone 37 to vent gases which may be released from the carbon black during the compression step. The compressed black is removed from conduit 35 through conduit 28.

A source of penetrating radiation 60 is positioned adjacent zone 37 such that radiation is transmitted through the carbon black contained in zone 37. The radiation transmitted through this zone impinges upon a suitable detector 61. The radiation emitted from source 60 comprises gamma rays, and detector 61 is a suitable gamma ray detector, such as a Geiger counter, for example. The output signal from detector 61 is applied to the input terminals of an amplifier 62, and the amplified output signal is applied to a motor speed controller 63 which is connected in circuit with motor 42 and a source of electrical energy 64. The quantity of radiation received by detector 61 is an inverse function of the density of the carbon black in zone 37. The output signal from this detector actuates controller 63 so that the speed of motor 42 is maintained at a value sufficient to transmit the carbon black through conveyor 35 at a speed whereby the density of the transmitted carbon black remains constant. In this manner, carbon black is fed to pellet mills 27 at a constant rate such that the quality of the resulting pellets is maintained uniform. Controller 63 can be any convenient control mechanism. For example, the output electrical signal from amplifier 62 can be connected in opposition to a reference voltage and the voltage difference applied to a reversible motor. This reversible motor, in turn, can adjust a rheostat to vary the voltage applied to motor 42. Alternatively, the output signal from amplifier 62 can vary the coupling between motor 42 and drive shaft 41 to vary the speed of rotation of shaft 41. The screw speed control per se is illustrated schematically because any conventional mechanism can be employed for this purpose.

In Figure 3, there is shown a modified form of control system wherein screw conveyor 26 is replaced by a belt conveyor. A flexible belt 70 is positioned to revolve about a pair of rollers 71 and 72, the latter being coupled to a motor 42'. A pair of spaced guides 73 and 74 is mounted on the upper surface of belt 70 and a plate 76 is mounted above belt 70 adjacent dropout box 25 so that a uniform bed of carbon black is maintained on belt 70 between guides 73 and 74. The radiation emitted from a source 60' which supplies beta rays, passes into the bed of carbon black and is partially reflected back to impinge upon a beta radiation detector 61', which is also mounted above belt 70. A plate 77 shields detector 61' from direct radiation. The amount of radiation reflected from the uniform bed of carbon black is a function of the density of the black. The output signal from detector 61' is amplified by amplifier 62' and applied to a motor speed controller 63' to regulate the speed of motor 42'. In this manner the speed at which belt 70 is revolved is adjusted in accordance with the measured density of the carbon black so that the mass of carbon black fed into pellet mills 27 per unit time is maintained constant.

In Figure 4, there is shown another modification of the control system of this invention. A suitable radioactive material is introduced through a conduit 80, which has a control valve 81 therein, into conduit 11 which feeds reactor 10. The rate of flow through conduit 80 is regulated by a conventional flow rate controller 82 which adjusts valve 81 in response to the rate of flow through conduit 11. In this manner, radioactive material, such as a radioactive hydrocarbon, is added to the reactor feed stream at a rate proportional to the rate the feed materials are added to the reactor. The resulting carbon black is thus radioactive, the radiation emitted from a given volume of the black being proportional to its density. A suitable detector such as 61 or 61' is employed as shown in Figures 2 or 3 to measure the radiation emitted from the carbon black passed by conveyor 26 or conveyor 70. The rate at which the carbon black is fed into pellet mill 27 is then adjusted such that the radiation received by the detector remains constant. In place of the introduction of radioactive material into conduit 11, such material can be added at any point upstream from conveyor 26 or conveyor 70, as, for example, in the quench water or directly into hopper 21. The material so added can be a radioactive carbon isotope. However, it is generally preferred to add the radioactive material as far upstream as possible to be assured of an even distribution of the material in the carbon black whereby the detected radiation provides an accurate measurement of the mass of black transmitted.

In Figure 5 there is shown a modified system of Figure 2 wherein conduit 35 is replaced by a pair of spaced conduits 90 and 91 which are separated by a conduit 92. Conduit 90 encloses a screw 40', and conduit 91 encloses a screw 44'. Conduit 92 is provided with a vent 53'. A radiation source 60' and a detector 61' are contained in the wall of conduit 92 in spaced relation. Source 60' emits beta rays which are absorbed by the carbon black in proportion to the density of the black. Beta rays are more readily absorbed than gamma rays and thus provide a more accurate measurement of the carbon black density. When beta rays are employed, however, the source and detector must be positioned inside conduit 92 to prevent the radiation from being absorbed completely by the conduit walls. The arrangement of Figure 5 thus enables beta rays to be used when it is desired to measure the absorbed radiation.

From the foregoing description of preferred embodiments of this invention it should be apparent that there is provided an improved method of an apparatus for controlling the introduction of carbon black into pellet mills. By measuring the density of the black passed into the pellet mills, the rate of addition of black to the mills can be controlled so that known masses of black are fed to the mills at all times. The quality of pellets produced is improved considerably by this method. While the invention has been described in conjunction with the present preferred embodiments it should be apparent that the invention is not limited thereto.

What is claimed is:

1. The method of operating a carbon black pelleting process which comprises passing a stream of loose carbon black into a pellet mill, subjecting the black to radiation from a source of radioactive energy so that radiation is emitted from a given volume of the carbon black at a rate representative of the density of the carbon black, measuring the emitted radiation from a predetermined volume of the carbon black, and adjusting the speed at which the black is passed into the mill in response to said measurement so that the black is passed into the mill at a uniform rate with respect to the mass of the black.

2. The method of claim 1 wherein the radiation is transmitted into a given volume of the black, and wherein the measured radiation is the radiation transmitted through the given volume of the black.

3. The method of claim 1 wherein the radiation is transmitted into a given volume of the black, and wherein the measured radiation is the radiation reflected from the given volume of the black.

4. The method of producing and pelleting carbon black which comprises reacting a hydrocarbon feedstock in a manner to produce carbon black, passing the produced loose carbon black into a pellet mill, adding radioactive material to the carbon black at a point upstream from the mill at a rate proportional to the rate at which said carbon black is produced, measuring the radiation emitted from a predetermined volume of said black at a point upstream from the mill and downstream from the point of addition of the radioactive material, and adjusting the speed at which said black is passed into the mill in response to said measurement so that the intensity of measured radiation remains constant.

5. The method of producing and pelleting carbon black which comprises reacting a hydrocarbon feedstock in a manner to produce carbon black, adding radioactive material to the hydrocarbon feedstock at a uniform rate so that the produced carbon black is radioactive, passing a stream of the produced loose carbon black into a pellet mill, continuously measuring the radiation emitted from a predetermined volume of said black passed into the mill, and adjusting the speed at which said black is passed into the mill in response to said measurement so that the intensity of measured radiation remains constant.

6. Carbon black producing apparatus comprising a reactor to produce carbon black, filter means to separate the produced carbon black from gases emitted from said reactor, a carbon black pellet mill, a conveyor to transfer loose carbon black from said filter means to said pellet mill, means to subject the carbon black to radiation from a source of radioactive energy so that radiation is emitted from a preselected volume of a carbon black at a rate representative of the density of the carbon black, means to measure the radiation emitted from the predetermined volume of the carbon black transferred by said conveyor, and means responsive to said means for measuring to adjust the speed of said conveyor so that said loose carbon black is conveyed at a uniform speed with respect to the mass of said loose carbon black.

7. The apparatus of claim 6 wherein said means to subject the black to radiation comprises a source of radioactive energy disposed adjacent said conveyor, and wherein said means to measure comprises a radiation detector adjacent said source and on the opposite side of said conveyor to measure the radiation transmitted through the black.

8. The apparatus of claim 7 wherein said conveyor comprises a screw conveyor.

9. The apparatus of claim 6 wherein said means to subject the black to radiation comprises a source of radioactive energy disposed adjacent said conveyor, and wherein said means to measure comprises a radiation detector adjacent said source and on the same side of said conveyor to measure the radiation reflected from the black.

10. The apparatus of claim 9 wherein said conveyor comprises a belt conveyor.

11. The apparatus of claim 6 wherein said conveyor comprises first and second screw conveyors, a conduit connecting said conveyors to form a continuous conveyor, means to rotate the screw of said first conveyor at a predetermined speed, means to rotate the screw of said second conveyor at a predetermined speed which is a function of the speed of rotation of said first conveyor, and means to add carbon black from said filter means to the end of said first conveyor opposite said second conveyor; said means to subject the black to radiation comprises a source of radioactive energy disposed adjacent said conveyor; said means to measure comprises a radiation detector adjacent said source and on the opposite side of said conduit to measure the radiation transmitted through the black; and said means to adjust the speed of said conveyor comprises means to adjust the speeds of rotation of the screws of said first and second conveyors.

12. Carbon black producing apparatus comprising a reactor to produce carbon black, filter means to separate the produced carbon black from gases emitted from said reactor, a carbon black pellet mill, a conveyor to transfer loose carbon black from said filter means to said pellet mill, means to add radioactive material to the system upstream from said pellet mill at a rate proportional to the rate at which said carbon black is produced, a radiation detector positioned adjacent said conveyor, and means responsive to the output signal of said detector to adjust the speed of said conveyor so that said loose carbon black is conveyed at a uniform speed with respect to the mass of said loose carbon black.

13. Carbon black producing apparatus comprising, in combination, a reactor to produce carbon black, first conduit means communicating with said reactor to supply a fluid hydrocarbon to be reacted, second conduit means communicating with said reactor to introduce a radioactive material therein, means responsive to the rate of flow through said first conduit means to control the rate of flow through said second conduit means so that the rate of flow through said second conduit means is proportional to the rate of flow through said first conduit means, filter means to separate the produced carbon black from gases emitted from said reactor, a carbon black pellet mill, a conveyor to transfer loose carbon black from said filter means to said pellet mill, a radiation detector disposed adjacent said conveyor to measure the radioactivity of the loose carbon black, and means responsive to said detector to adjust the speed of said conveyor so that said loose carbon black is conveyed to said pellet mill at a uniform speed with respect to the mass of the loose carbon black.

References Cited in the file of this patent

UNITED STATES PATENTS

| | | |
|---|---|---|
| 1,191,072 | Fessenden | July 11, 1916 |
| 2,306,698 | Heller | Dec. 29, 1942 |
| 2,457,962 | Whaley | Jan. 4, 1949 |
| 2,504,546 | Wight et al. | Apr. 18, 1950 |
| 2,554,583 | McFall | May 29, 1951 |
| 2,599,975 | Carpenter | June 10, 1952 |
| 2,674,363 | Graham | Apr. 6, 1954 |

FOREIGN PATENTS

| | | |
|---|---|---|
| 684,503 | Great Britain | Dec. 17, 1952 |

OTHER REFERENCES

Cabot et al. "J. of Institute of Petroleum," vol. 36, No. 324, Dec. 1950, page 713.

Perry: "Chemical Engineers Handbook," 3rd ed., pages 1292, 1293 and 1373. McGraw-Hill Book Co., 1950.